(12) United States Patent  
Houck et al.

(10) Patent No.: US 8,705,317 B2  
(45) Date of Patent: Apr. 22, 2014

(54) METHOD FOR IMAGING OF TARGETED REFLECTORS

(75) Inventors: Richard T. Houck, Houston, TX (US); Graham A. Winbow, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 459 days.

(21) Appl. No.: 13/124,795

(22) PCT Filed: Dec. 4, 2009

(86) PCT No.: PCT/US2009/066703  
§ 371 (c)(1),  
(2), (4) Date: Apr. 18, 2011

(87) PCT Pub. No.: WO2010/077567  
PCT Pub. Date: Jul. 8, 2010

(65) Prior Publication Data  
US 2011/0199860 A1     Aug. 18, 2011

Related U.S. Application Data

(60) Provisional application No. 61/138,446, filed on Dec. 17, 2008.

(51) Int. Cl.  
*G01V 1/00*     (2006.01)  
*G01V 1/28*     (2006.01)  
*G01V 1/30*     (2006.01)

(52) U.S. Cl.  
CPC ............... *G01V 1/282* (2013.01); *G01V 1/308* (2013.01)  
USPC ............................................................ 367/73

(58) Field of Classification Search  
USPC ..................................................... 367/68, 73  
See application file for complete search history.

(56) References Cited

U.S. PATENT DOCUMENTS

| 3,921,126 A | 11/1975 | Waters |
| 4,784,189 A | 11/1988 | Hellström |

(Continued)

FOREIGN PATENT DOCUMENTS

| CA | 2 542 416 | 5/2005 |
| GB | 2 372 567 | 8/2002 |

(Continued)

OTHER PUBLICATIONS

Sarka, S. et al. (2003), "On the inversion of time-lapse seismic data," *SEG Expanded Abstracts* 22, 4 pgs.

(Continued)

*Primary Examiner* — Krystine Breier  
(74) *Attorney, Agent, or Firm* — ExxonMobil Upstream Research Company Law Dept.

(57) ABSTRACT

Techniques are disclosed for performing time-lapse seismic monitor surveys with sparsely sampled monitor data sets. A more accurate 3D representation (e.g., image) of a target area (e.g., a hydrocarbon bearing subsurface reservoir) is constructed using the sparsely sampled monitor data set (11). The sparsely sampled monitor data set may be so limited that it alone is insufficient to generate an accurate 3D representation of the target area, but accuracy is achieved through use of certain external information (14). The external information may include information accurately identifying a shape of the seismic reflector(s) present in the target area. The shape may be predetermined from a fully sampled base survey, and used to enable an accurate 3D representation (12) of the target area to be later generated for a monitor survey using a sparsely sampled monitor data set.

15 Claims, 5 Drawing Sheets

(56) References Cited

U.S. PATENT DOCUMENTS

| | | | |
|---|---|---|---|
| 4,884,248 A | 11/1989 | Laster et al. |
| 4,969,130 A | 11/1990 | Wason et al. |
| 4,992,996 A | 2/1991 | Wang |
| 5,018,112 A | 5/1991 | Pinkerton et al. |
| 5,148,406 A | 9/1992 | Brink et al. |
| 5,586,082 A | 12/1996 | Anderson et al. |
| 5,629,904 A | 5/1997 | Kosloff et al. |
| 5,638,269 A | 6/1997 | Fournier et al. |
| 5,796,678 A | 8/1998 | Pisetski |
| 5,798,982 A * | 8/1998 | He et al. ............... 367/73 |
| 5,831,935 A | 11/1998 | Luo et al. |
| 5,870,690 A | 2/1999 | Frenkel et al. |
| 5,873,051 A | 2/1999 | Van Bemmel et al. |
| 5,878,372 A | 3/1999 | Tabarovsky et al. |
| 5,905,657 A | 5/1999 | Celniker |
| 5,986,974 A | 11/1999 | Luo et al. |
| 6,028,820 A | 2/2000 | Pisetski |
| 6,041,018 A | 3/2000 | Roche |
| 6,057,561 A | 5/2000 | Kawasaki et al. |
| 6,125,330 A | 9/2000 | Robertson et al. |
| 6,266,619 B1 | 7/2001 | Thomas et al. |
| 6,317,384 B1 | 11/2001 | Luo et al. |
| 6,356,844 B2 | 3/2002 | Thomas et al. |
| 6,374,201 B1 | 4/2002 | Grizon et al. |
| 6,389,361 B1 | 5/2002 | Geiser |
| 6,438,069 B1 | 8/2002 | Ross et al. |
| 6,498,989 B1 | 12/2002 | Pisetski et al. |
| 6,529,833 B2 | 3/2003 | Fanini et al. |
| 6,553,315 B2 | 4/2003 | Kerekes et al. |
| 6,560,540 B2 | 5/2003 | West et al. |
| 6,574,563 B1 | 6/2003 | Nickel |
| 6,614,717 B1 | 9/2003 | Khan et al. |
| 6,691,075 B1 | 2/2004 | Winbow et al. |
| 6,694,263 B2 | 2/2004 | Fournier et al. |
| 6,715,551 B2 | 4/2004 | Curtis et al. |
| 6,763,304 B2 | 7/2004 | Schonewille |
| 6,763,305 B2 * | 7/2004 | Bernitsas ............... 702/14 |
| 6,778,918 B2 | 8/2004 | Delhomme et al. |
| 6,801,858 B2 | 10/2004 | Nivlet et al. |
| 6,826,483 B1 | 11/2004 | Anderson et al. |
| 6,829,538 B2 | 12/2004 | De Kok |
| 6,853,921 B2 | 2/2005 | Thomas et al. |
| 6,876,928 B2 | 4/2005 | Van Riel et al. |
| 6,889,142 B2 | 5/2005 | Schonewille |
| 6,904,368 B2 | 6/2005 | Reshef et al. |
| 6,906,982 B2 | 6/2005 | Calvert |
| 6,912,466 B1 | 6/2005 | Gao |
| 6,980,940 B1 | 12/2005 | Gurpinar et al. |
| 6,985,404 B2 | 1/2006 | Mallick |
| 6,989,841 B2 | 1/2006 | Docherty |
| 7,027,354 B2 | 4/2006 | Cole et al. |
| 7,027,929 B2 | 4/2006 | Wang |
| 7,079,952 B2 | 7/2006 | Thomas et al. |
| 7,162,463 B1 | 1/2007 | Wentland et al. |
| 7,167,414 B2 | 1/2007 | Lee et al. |
| 7,242,637 B2 | 7/2007 | Van Den Beukel et al. |
| 7,254,999 B2 | 8/2007 | Bostick, III |
| 7,298,671 B2 | 11/2007 | Brinkmann et al. |
| 7,355,923 B2 | 4/2008 | Reshef et al. |
| 7,376,539 B2 | 5/2008 | Lecomte |
| 7,456,113 B2 | 11/2008 | Rayandayan et al. |
| 7,478,024 B2 | 1/2009 | Gurpinar et al. |
| 7,523,003 B2 | 4/2009 | Robertsson et al. |
| 7,577,061 B2 | 8/2009 | Williamson et al. |
| 7,620,534 B2 | 11/2009 | Pita et al. |
| 7,660,711 B2 | 2/2010 | Pita et al. |
| 7,739,089 B2 | 6/2010 | Gurpinar et al. |
| 7,752,022 B2 | 7/2010 | Fornel et al. |
| 7,797,996 B2 | 9/2010 | Bostick, III |
| 7,859,943 B2 | 12/2010 | Herwanger |
| 7,953,585 B2 | 5/2011 | Gurpinar et al. |
| 8,086,426 B2 | 12/2011 | El Ouair et al. |
| 2006/0153005 A1 | 7/2006 | Herwanger et al. |
| 2006/0285435 A1 | 12/2006 | Robertsson |
| 2008/0004847 A1 | 1/2008 | Bradford |
| 2008/0170468 A1 | 7/2008 | Brain et al. |

FOREIGN PATENT DOCUMENTS

| | | |
|---|---|---|
| WO | WO 99/67660 | 12/1999 |
| WO | WO 00/19240 | 4/2000 |
| WO | WO 2004/090575 | 10/2004 |
| WO | WO 2009/011735 | 1/2009 |
| WO | WO 2009/051899 | 4/2009 |
| WO | WO 2009/027420 | 5/2009 |
| WO | WO 2010/075568 | 7/2010 |
| WO | WO 2010/077569 | 7/2010 |

OTHER PUBLICATIONS

Barkved, O.I. et al. (2005), "Valhall Permanent Seismic Monitoring—Reducing Geological Model Uncertainties Using 4-D Seismic," *EAGE Expanded Abstract*.

Beyreuther, M. et al. (2005), "Computation of time-lapse differences with 3D directional frames," XP002550568, SEG/Houston Annual Meeting, pp. 2488-2492.

Candes, E. et al. (2006), "Fast Discrete Curvelet Transforms," *Mutiscale Model. Simul.* 5(3), pp. 861-899.

Ceragioli, E. et al. (2006), "Filling the Gap—Integrating Nodes and Streamer Data for Geophysical Monitoring Purposes," *EAGE Expanded Abstract*, 5 pgs.

Curtis, (2004), "Theory of Model-based Geophysical Survey and Experimental Design," *The Leading Edge* 23, pp. 997-1004.

Kaldy, W.J. et al. (2006), "Short Cable 4D Investigation—Case History from the Amberjack field in the Gulf of Mexico," SEG/New Orleans Annual Meeting, pp. 3170-3174.

Landrø, M. et al. (2004), "Time lapse refraction seismic—a toll for monitoring carbonate fields?" *SEG Expanded Abstract*.

Landrø, M. et al. (2005), "Pressure depletion measured by time-lapse VSP," *The Leading Edge*, pp. 1226-1232.

Lüth, S. et al. (2005), "Fresnel volume migration of multicomponent data," *Geophysics* 70(6), pp. S121-S129.

Smit, F. et al. (2006), "Toward affordable permanent seismic reservoir monitoring using the sparse OBC concept," *The Leading Edge*, pp. 454-459.

Staples, R. et al. (2006), "Time-Lapse (4D) Seismic Monitoring—Expanding Applications," 2006 CSPG,—CSEG, CWLS Convention, pp. 181-189.

*European Search Report*, dated Oct. 21, 2009, EP 09 15 8929.

*International Search Report and Written Opinion*, dated Feb. 4, 2010, PCT/US2009/066703.

* cited by examiner

METHOD FOR IMAGING OF TARGETED REFLECTORS

CROSS-REFERENCE TO RELATED APPLICATIONS

This application is the National Stage of International Application No. PCT/US2009/066703, that published as WO 2010/077567, filed 4 Dec. 2009, which claims the benefit of U. S. Provisional Application No. 61/138,446, filed 17 Dec. 2008, each of which is incorporated herein by reference, in its entirety, for all purposes.

TECHNICAL FIELD

The following description relates generally to acquisition and processing of data for generating a 3D representation (e.g., image) of a target subsurface area, such as a target hydrocarbon bearing subsurface reservoir, and more particularly to techniques for performing time-lapse seismic surveying using sparsely acquired seismic data.

BACKGROUND

In geological exploration it is desirable to obtain information regarding the various formations and structures that exist beneath the Earth's surface. Such information may include determining geological strata, density, porosity, composition, etc. This information may then be used to generate a representation of the subsurface basin using the obtained data to predict the location of hydrocarbon reserves and aid in the extraction of hydrocarbon.

A general goal of seismic processing is to image subsurface reflectors. In a general application, during a seismic survey, seismic energy is generated by a source and travels vertically as body waves into subsurface regions to reflectors, and then returns to receivers (e.g., geophones). The reflected energy received may then be processed to determine a representation of the subsurface region (e.g., via imaging) to, for example, analyze the location of hydrocarbon reserves.

Three-dimensional (3D) seismic survey techniques are well-known in the art. In general, seismic monitor data (e.g., the above-mentioned reflected energy collected by a receiver, such as a geophone) is acquired for a target area (or "field") that is of interest, and such seismic monitor data is processed to form a representation of the subsurface region that is the target area. The representation of the subsurface may take any of various different forms, including an image of the subsurface at various depths. Such representation of the subsurface may identify the geological formations (e.g., location, shape, etc. of different geological materials/objects), including hydrocarbon bearing underground reservoirs of fluids (e.g., oil, gas, water). Conventional 3D seismic surveys include three dimensions relating to the spatial characteristics of the subsurface formation. Generally, two dimensions correspond to horizontal length dimensions, and the third dimension relates to depth in the subsurface formation, which can be represented by a length coordinate (or by a time coordinate, such as the two-way travel time of a seismic wave from surface to a certain depth and back).

Seismic surveying techniques generally investigate the subsurface formation by generating seismic waves that travel through the subsurface formation, and measuring the time the waves need to travel between one or more seismic sources and one or more seismic receivers. The travel time of a seismic wave is dependent on the length of the path traversed, and the velocity of the wave along the path. 3D seismic surveying is commonly employed when analyzing a target field for potential drilling to extract fluids (e.g., for determining whether and/or where in the target field to drill). As discussed further herein, such 3D seismic surveying has traditionally been computationally intensive, expensive, and have involved significant time to produce.

Time-lapse seismic surveying is increasingly used for studying of subsurface formations. It is applied for monitoring of hydrocarbon bearing underground reservoirs, in particular to follow the effects resulting from producing (i.e., "extracting") reservoir fluids (e.g., oil, gas, water) through a well to the surface.

In time-lapse seismic surveying, seismic data is acquired at two or more points in time. Time is therefore an additional parameter with regard to conventional seismic surveying. This is useful in studying the changes in seismic properties of the subsurface as a function of time due to, for example, spatial and temporal variation in fluid saturation, pressure, temperature, and/or other seismic properties. Conventionally, such time-lapse seismic surveying involves performing the above-mentioned 3D surveying at different points in time. Thus, time-lapse seismic surveying is also referred to as 4-dimensional (4D) seismic surveying, wherein time between seismic data acquisitions represents a fourth data dimension. As in the above-mentioned 3D surveying, the three other dimensions relate to the spatial characteristics of the earth formation. The time span between the first and the second point in time at which seismic data are acquired may be several years. Conventionally, one normally tries to acquire the first and second seismic data sets in a similar manner, so that the data sets are easier to compare.

Time-lapse (or "4D") seismic surveying has become a common tool for monitoring changes in producing hydrocarbon reservoirs. The information about changes in reservoir fluid distribution and pore pressure provided by time-lapse surveys is useful in making decisions in reservoir management. Decisions affected by time-lapse seismic surveying include placement of infill wells and control of production and injection rates to maximize oil recovery efficiency, as examples.

The typical implementation of time-lapse seismic involves collecting a sequence of 3D seismic surveys over a producing reservoir, and using the representations (e.g., images) generated from the recorded seismic data to infer changes in reservoir conditions over time. For economic reasons, some time-lapse surveys have been collected using conventional marine streamer acquisition, where a boat sails a grid of lines over the reservoir, continuously activating seismic sources and recording data using receivers in long streamers towed behind the boat. However, the method has also been implemented using receivers placed on the sea floor, in bore-holes, and, for onshore fields, using conventional 3D land acquisition methods.

The first survey in the time-lapse sequence, commonly called the "base survey," is ideally acquired before production starts. The processed image generated from the base survey measures the initial seismic response of the reservoir. One or more later surveys, called "monitor surveys," are acquired at time intervals that depend on the expected dynamic properties (e.g., fluid distribution and pressure) of the reservoir; e.g., one to three year intervals are typical.

The reservoir image generated from a monitor survey is different from the base survey image. Some of this difference is due to changes in dynamic reservoir properties; and some is due to a variety of other factors not related to reservoir changes. Differences between base and monitor images that are not associated with reservoir changes, commonly called "non-repeatability", can mask the differences that indicate reservoir changes. Minimizing non-repeatability is one of the objectives of time-lapse acquisition and processing.

Acquiring and processing a full 3D monitor survey is time-consuming and expensive. The time required to acquire, process and interpret a given survey can exceed one year, and the cost associated with acquiring and processing a full 3D seismic survey may be upwards of twenty million U.S. dollars. The delay in time required for a full 3D seismic survey can result in missed opportunities for affecting reservoir management decisions. And, the cost of the seismic survey may exceed the benefits of the information that results from the seismic survey. Consequently, reducing the time and the cost of time-lapse seismic surveys has been an ongoing industry objective.

One approach that has been proposed for reducing the time and cost of time-lapse surveys is to permanently install an array of seismic receivers over the reservoir. See e.g., Barkved, O. I., K. Buer, and T. G. Kristiansen, 2005, *Valhall Permanent Seismic Monitoring—Reducing Geological Model Uncertainties Using 4-D Seismic*, EAGE 2005 Expanded Abstract. Once the receivers are in place, repeated seismic surveys can be acquired at relatively low cost by activating appropriate seismic sources over the receivers. However, although the cost of a repeat survey is lowered in this approach, the initial cost of installing the receiver array in the first place is undesirably high. Full permanent installations are generally economically advantageous when the field is small and shallow (so it can be covered without having to use a large number of receivers), and when the field has a long production life (so the cost of the installation can be spread over many monitor surveys). Because they are appropriate under a limited set of conditions, full permanent installations are rarely used.

A second approach is simply to record less seismic data in monitor surveys, thereby attempting to reduce cost and/or time involved with performing the monitor surveys. This approach has been tested with permanent (see Smit, F., M. Ligtendag, P. Wills, and R. Calvert, 2006, *Toward Affordable Permanent Seismic Reservoir Monitoring Using the Sparse OBC Concept*, The Leading Edge) and redeployable (see Ceragioli, E., A. Kabbej, A. Gonzalez Carballo, and D. Martin, 2006, *Filling the Gap—Integrating Nodes and Streamer Data for Geophysical Monitoring Purposes*, EAGE 2006 Expanded Abstract) sea-bottom receivers, and with short marine streamers (see Kaldy, W. J., K. Hartman, P. Sen, C. Barousse, D. Stauber, and E. Xu, 2006, *Short Cable 4D Investigation—Case History from the Amberjack Field in the Gulf of Mexico*, SEG 2006 Expanded Abstract). These tests indicate that 3D seismic images generated from a limited seismic data set were contaminated with levels of non-repeatable noise and imaging artifacts that were too high for most time-lapse applications.

One way to avoid artifacts that arise from conventional 3D imaging is by not performing 3D imaging. Time-lapse 2D imaging, as reported by Staples, R, J. Stammeijer, S. Jones, J. Brain, F. Smit, and P. Hatchell, 2006, *Time-Lapse (4D) Seismic Monitoring—Expanding Applications*, CSEG Expanded Abstract, is faster and cheaper than 3D, and a 2D image does not contain the same kind of artifacts as a reduced-data 3D image. However, 2D imaging has its own shortcomings that make it inappropriate for time-lapse surveys, except in special circumstances. For instance, such 2D imaging assumes that the subsurface variations take place in the direction of the 2D line. This assumption is generally not satisfied in the actual subsurface region being targeted, so a 2D image is a distorted version of the targeted subsurface.

Other methods that do not use 3D imaging are time-lapse refraction (see Landro, M., A. K. Nguyen, and H. Mehdizadeh, 2004, *Time-Lapse Refraction Seismic—A Tool for Monitoring Carbonate Fields*, SEG 2004 Expanded Abstract), and time-lapse vertical seismic profile (VSP) (see Landro, M., P. Digranes, and L. K. Strønen, 2006, *Pressure Depletion Measured by Time-Lapse VSP*, The Leading Edge, 24, 1226), but these are also useful only under special circumstances.

SUMMARY

In view of the above, a need exists in the art for a technique for performing time-lapse seismic monitor surveys in a more time-efficient and economical manner. For instance, a desire exists for a technique for performing time-lapse seismic monitor surveys by acquiring less seismic data. However, it is also desirable for a technique that can use such a sparsely sampled seismic monitor data set for generating an accurate 3D representation (e.g., 3D seismic image) of the target area (e.g., subsurface hydrocarbon reservoir) being analyzed, wherein the generated 3D representation is not contaminated with unacceptably-high levels of non-repeatable noise and imaging artifacts.

In one aspect of this the invention, one would like to use a sparsely sampled monitor data set, which could be acquired and processed quickly and at low cost, to obtain information about dynamic reservoir changes, where the information has quality similar to information derived from fully sampled 3D surveys. As mentioned above, prior efforts at accomplishing this have demonstrated that eliminating part of the seismic data that is conventionally acquired may also eliminate some of the information about reservoir changes because it results in a 3D representation that is contaminated with high levels of non-repeatable noise and/or imaging artifacts.

The present invention is thus directed generally to systems and methods for performing time-lapse seismic monitor surveys with sparsely sampled seismic monitor data sets. For instance, systems and methods are disclosed for performing a time-lapsed seismic monitor survey that enables an accurate 3D representation (e.g., image) of a target area (e.g., reservoir or subsurface region) to be constructed using a sparsely sampled seismic monitor data set that is acquired for the monitor survey. In embodiments of the present invention, the obtained sparsely sampled seismic monitor data set is so limited that it alone is insufficient to generate an accurate 3D representation of the target area. That is, the sparsely sampled seismic data set alone is insufficient to, through use of known 3D imaging techniques; produce a 3D representation having a desired resolution for confident analysis of the target area. However, accuracy of the 3D representation is enabled through the use of certain external information in addition to the sparsely sampled seismic monitor data set to generate a 3D representation of the subsurface region. That is, the sparsely sampled seismic monitor data set that is obtained for a time-lapsed monitor survey may be processed with other external information, such as certain information that is predetermined (e.g., in an earlier base survey) and/or certain information that is predicted or derived (e.g., from an earlier base survey), to generate an accurate 3D representation of the target area at the point in time of acquisition of the sparsely sampled seismic monitor data set.

In general, in the context of the present application, a sparsely sampled seismic monitor data set refers to a seismic data set that is received from a configuration of sources and receivers where conventional imaging (i.e., migration) is inapplicable, or where conventional migration produces an image that is inadequate for time-lapse analysis. As one example of acquisition of sparsely sampled seismic monitor data, an arrangement of source and receiver locations such as that disclosed in the example of FIG. 4 (described further herein) may be employed, which has enough sources and receivers to cover the entire target area, but the sources and receivers are arranged such that the migrated image they produce is contaminated with artifacts. The sparsely sampled seismic monitor data set may, in some instances, be data sets that are so limited that conventional migration does not produce an image that is in any sense representative of the real subsurface. However, as disclosed further herein, such sparsely sampled monitor data sets may be used with external data for enhanced analysis of the target area.

According to one embodiment, a base survey is initially conducted for a target area, wherein the base survey may be performed in a conventional manner in which fully sampled 3D seismic data sets are acquired for processing to generate an accurate 3D representation of the target area as it exists at the point in time at which the 3D seismic data sets are acquired. At some point in time later, a time-lapsed seismic monitor survey is performed, wherein a sparsely sampled seismic monitor data set is acquired for the target area. Time and/or cost associated with conducting the later time-lapsed seismic monitor survey may be reduced from that associated with the base survey because less seismic data is acquired. As one example of acquisition of a sparsely sampled seismic monitor data set, an arrangement of source and receiver locations such as that disclosed later herein with reference to FIG. 4 may be employed. These exemplary sparse sampling records utilize about a factor of forty less seismic data than is needed to image the same area with conventional 3D imaging techniques using a traditional fully sampled seismic data acquisition.

In embodiments of the present invention, the sparsely sampled seismic monitor data set that is obtained for the later time-lapsed seismic monitor survey is so limited that it alone is insufficient to generate an accurate 3D representation of the target area. A conventional fully sampled 3D survey records many "extra" traces to meet the requirements of 3D imaging. Failing to meet these requirements traditionally produces imaging artifacts that are particularly problematic for time-lapse interpretation. Embodiments of the present invention enable a sparse sampling of seismic monitor data to be acquired for use in generating a 3D representation of the target area. For instance, in certain embodiments, such as discussed further herein, targeted imaging is performed, which may, depending on the size and depth of the target, enable the sparsely sampled seismic monitor data set acquisition to be reduced by a factor of twenty to fifty fewer traces than are traditionally utilized for fully sampled seismic data used for conventional 3D imaging techniques. Other embodiments, such as those discussed further in the aforesaid PCT International Application based on U.S. Provisional Patent Application No. 61/138,447 titled "System and Method for Performing Time-Lapse Monitor Surveying Using Sparse Monitor Data" and those discussed further in the aforesaid PCT International Application based on U.S. Provisional Patent Application No. 61/138,451 titled "System and Method for Reconstruction of Time-Lapse Data", may enable even fewer traces to be acquired in the sparsely sampled seismic monitor data set, depending on details of the target area. Of course, there is a tradeoff involved, as the "extra" traces may be useful for reducing the effect of recorded noise. Thus, for noisy target areas, more data traces may be desirable.

The sparsely sampled seismic monitor data set that is acquired for the time-lapsed monitor survey is then processed with other external information, such as certain information that was predetermined (e.g., in an earlier base survey) and/or certain information that is predicted or derived (e.g., from an earlier base survey), to generate an accurate 3D representation of the target area at the later point in time at which the sparsely sampled seismic monitor data set is acquired.

Certain embodiments of this invention use one or more sparsely sampled seismic monitor data sets to monitor subsurface hydrocarbon reservoir changes by replacing some of the information lost by reducing the amount of seismic data with external information, either from seismic or non-seismic sources. The external information that is used may differ according to different embodiments.

In one embodiment, such as discussed further herein, the external information may include information accurately identifying a shape of the reflector(s) present in the target area. That is, the shape of seismic reflectors present in a target area may be predetermined from a base survey, and that information may be used to enable an accurate 3D representation of the target area to be later generated for a monitor survey using a sparsely sampled seismic monitor data set. For instance, as mentioned above, an accurate representation of the target area may be initially determined (e.g., prior to determining to drill the target area) by conducting a fully sampled 3D seismic survey (i.e., a "base survey"). From the base survey, an accurate shape of the reflectors is determined. In a later, time-lapsed monitor survey, a sparsely sampled seismic monitor data set is acquired, and sufficient data processing does not have to be performed to determine the shape of the reflector(s). Instead, the predetermined shape (known from the base survey) is used to more accurately compute, from the sparsely sampled seismic monitor data set that is acquired, the amplitude data from the seismic reflectors of the target area at the later time.

According to one embodiment, a method for imaging amplitude variations on a reflecting surface is provided. More particularly, the method enables imaging amplitude variations from a sparsely sampled seismic monitor data set. The method includes acquiring a sparsely sampled seismic monitor data set for a target area (e.g., a hydrocarbon bearing subsurface reservoir). The method further includes defining geometry of a target reflector present in the target area. The target reflector may, in certain embodiments, be defined using a different seismic data set than the sparsely sampled seismic monitor data set. For instance, the geometry may be defined using a prior-conducted fully sampled base survey. In other embodiments, the geometry of the target reflector is defined using a structure image constructed from the sparsely sampled seismic monitor data set.

The method further includes estimating a seismic wavelet at the target reflector. Wavelet estimation is a standard, well-known process in seismic processing. For each recorded seismic trace in the sparsely sampled seismic monitor data set:
  a) ray tracing is performed to determine the reflection point location and arrival time on the target reflector. As is known in the art, ray tracing computes the time required for a seismic ray to travel from a known source location to an unknown location on a reflector to a known receiver location. Ray tracing is a well-known in the seismic (and in other wave propagation) arts; and
  b) samples from the recorded trace are summed into a Fresnel zone around the determined reflection point. "Fresnel Zone" is a standard, well-known concept from physical optics. In seismic processing, it commonly refers to the area around a reflection point that contributes to the amplitude of the reflected wave. The classic definition (from optics) is for a single-frequency wave, but there are several interpretations that can be used when dealing with a broadband waveform (one that contains a range of frequencies), as is the case with seismic. Certain embodiments of the present invention perform imaging by summing the recorded waves only into this restricted area around each reflection point, as illustrated in FIG. 3.

In addition, in certain embodiments, illumination corrections are then applied. Illumination corrections are spatially varying scale factors that may be applied to seismic images. Information about reservoir changes are indicated as changes in the amplitude of the seismic reflections—how "bright" they appear in the processed image. However, reflector amplitude also depends on details of the survey geometry—how the sources and receivers are arranged relative to the reflector. "Illumination" refers to the effect that source, receiver, and reflector geometry have on amplitude. Differences in illumination can cause some parts of the imaged reflector to be brighter than others even if the reflector itself is the same everywhere. Much of the pattern in the migrated amplitudes map of FIG. 5, discussed further herein, is caused by illumination differences. Because illumination differences can be mistaken for actual changes in the reflector, it is optimal to have no illumination differences between data sets from the base survey and monitor survey. A sparsely sampled monitor data set, however, may result in illumination that is much different from that provided by a fully sampled base survey. Certain embodiments of the present invention may minimize the illumination errors by using the known reflector geometry, along with the monitor source and receiver locations, to model an amplitude map for the target reflector. The amplitude map may include a 2D map of the target reflector which may not be a full 3D image. Any amplitude variations that are present in the modeled map are illumination artifacts. Modeled map is an image of the model reflector along with source and receivers locations based on an estimate for the target area. The illumination artifacts can be removed from the measured data amplitudes by dividing the amplitudes in the measured data map by the amplitudes in the modeled map. The measured data map is an image of the measured reflector along with the source and receiver locations.

Thus, according to certain embodiments, as discussed further herein, the external information may include known geometry of target reflectors present in the target area being analyzed. Thus, instead of trying to perform a full interpretation of the sparsely sampled monitor data set, in certain embodiments, such sparsely sampled monitor data set is processed using the known geometry of target reflectors to generate a 3D representation of the target area.

In certain embodiments, as discussed further in the aforesaid patent application titled "System and Method for Performing Time-Lapse Monitor Surveying Using Sparse Monitor Data", the disclosure of which is incorporated herein by reference, the external information may include alternative models of the target area that are representative of different predictions regarding how the target area may change over a lapse of time. For instance, an accurate representation of the target area may be initially determined (e.g., prior to determining to drill the target area) by conducting a fully sampled 3D seismic survey (i.e., a "base survey"), and the alternative models may represent predicted changes that may occur in the target area over a lapse of time. The alternative models may, for example, reflect differences in permeability of at least a portion of the target area. Thus, the models may reflect how the initially-determined 3D representation of the target area (as determined in the base survey) may change over the time lapse based on whether a permeability barrier, low permeability, or high permeability is encountered in the target area. The acquired sparsely sampled seismic monitor data set may then be processed to determine which of the plurality of alternative models is representative of the target area. Thus, instead of trying to perform a full interpretation of the sparsely sampled seismic monitor data set, in certain embodiments; such sparsely sampled seismic monitor data set is used to determine which of the plurality of alternative models is representative of the target area as it exists at the time of acquisition of the sparsely sampled seismic monitor data set.

In certain embodiments, as discussed further in the aforesaid patent application titled "System and Method for Reconstruction of Time-Lapse Data", the disclosure of which is incorporated herein by reference, the external information may include a base survey which is transformed in a manner consistent with the sparsely sampled seismic monitor data set acquired in a later monitor survey to result in a derivation of fully sampled 3D seismic data that can be processed in a traditional manner for computing an accurate 3D representation (e.g., 3D image) of the target area under analysis.

Thus, according to certain embodiments, external information is utilized in designing the acquisition and/or processing of the monitor data set, thereby enabling a sparsely sampled seismic monitor data set to be acquired for the monitor survey, while also enabling generation of an accurate 3D representation of the target area.

Of course, seismic surveys generally use some kind of external information in acquisition design and processing. Certain embodiments of the present invention differ in that the external information functions not as a supplementary aid, but as a necessary input for overcoming the deficiencies of 3D imaging, or for circumventing 3D imaging altogether. That is, the external information (e.g., the shape of the target reflector) is used to get an image of sufficient quality to be used for time lapse. Without this external information, the image is not useable for this purpose. As an example, typical conventional time-lapse approaches try to generate a monitor image entirely from the acquired/recorded seismic data. External information may be used in conventional techniques in, for example, building a velocity model, but the 3D image of the target area is constructed using only the acquired/recorded seismic data. Embodiments of the present invention further employ appropriate external information to construct an accurate 3D image for the target area as it exists at the time that the sparsely sampled seismic monitor data set is acquired.

Further, conventional imaging methods normally used to process time-lapsed seismic data in a monitor survey make no assumptions about the target area (e.g., reservoir) that is being analyzed. Consequently, in conventional imaging methods the acquired seismic data typically supplies all the information needed to construct a 3D reservoir image. The incomplete information provided by a sparsely sampled seismic monitor data set, alone, is inadequate for constructing 3D images that are sufficiently repeatable for time-lapse analysis. As discussed further with certain embodiments of the present invention, certain external information is used to compensate for the incompleteness of the seismic data set. For instance, a predetermined shape of seismic reflectors present in the target area is employed in certain embodiments to aid in providing an accurate 3D representation of the target area to be generated from a sparsely sampled seismic monitor data set.

Not all forms of external information are capable of replacing absent seismic information. According to certain embodiments of the present invention, the external information utilized is selected to sufficiently constrain the reservoir to enable the sparsely sampled seismic monitor data set that is acquired to disambiguate the condition/state of the reservoir. Examples of external information that can function this way include:

1. a structure map of a particular reservoir reflector, such as described further herein;
2. a set of specific reservoir model scenarios that have different interpretations and fluid flow properties, such as described further in the aforesaid patent application titled "System and Method for Performing Time-Lapse Monitor Surveying Using Sparse Seismic Monitor Data", the disclosure of which is incorporated herein by reference; and
3. a fully sampled and interpreted 3D base seismic survey of the target area, such as described further in the aforesaid patent application titled "System and Method for Reconstruction of Time-Lapse Data", the disclosure of which is incorporated herein by reference.

In certain embodiments, some interpretation takes place before acquisition and processing of the sparsely sampled seismic monitor data set for a monitor survey, and the results of the interpretation are part of the structure of the acquisition and processing of the sparsely sampled seismic monitor data set.

The foregoing has outlined rather broadly the features and technical advantages of the present invention that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
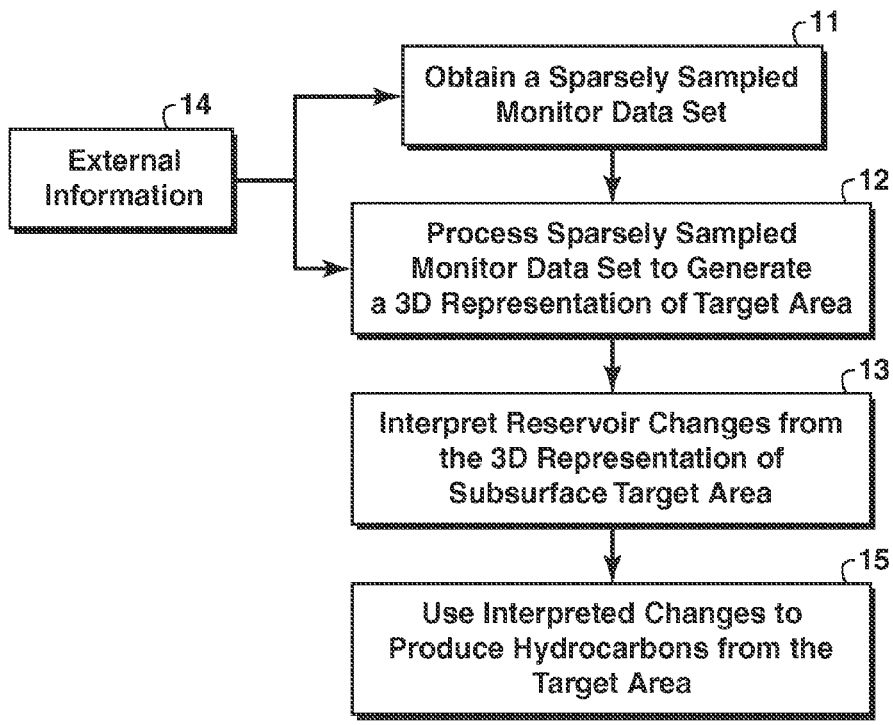
FIG. 1 shows a general flow diagram according to certain embodiments of the present invention.

As mentioned above, traditional time-lapse monitor surveys have been full-scale 3D surveys (e.g., fully sampled 3D surveys) with a density of source and receiver locations similar to that of the initial base survey. Even under good conditions, this can be costly, and in some cases, producing infrastructure may make it operationally unfeasible/impractical to acquire a fully sampled monitor data set from a monitor survey. A sparsely sampled monitor data set, however, can result in an uninterpretable time-lapse survey because reservoir changes are typically obscured by non-repeatable artifacts and noise. As discussed further below, certain embodiments of the present invention disclose a technique wherein, instead of trying to perform a full interpretation of a time-lapse sparsely sampled monitor data set, such sparsely sampled monitor data set is processed using external information (not necessarily obtained in the sparsely sampled seismic data set) regarding the shape (or "geometry") of seismic reflectors present in the target area to generate an accurate 3D representation of the target area as the target area exists at the time of the acquisition of the monitor survey. In certain embodiments, such shape information for the reflectors is predetermined shape information, such as may have been predetermined in a base survey conducted for the target area. In other embodiments, the shape information includes a structure image that is constructed from the sparsely sampled monitor survey being conducted.

In general, a seismic reflector refers to a boundary between subsurface structures (e.g., rocks) with two different impedances. Typically, in the context of a hydrocarbon bearing subsurface reservoir, an example of a seismic reflector is the boundary between a reservoir seal, which is typically impermeable shale, and a fluid-saturated reservoir rock, which may be a sandstone, carbonate, etc. Thus, a structure map (of the geometry or shape of the reflectors) may be a map of the reflection in the form of the subsurface structures (e.g., the subsurface reservoir).

Conventional 3D imaging techniques for a monitor survey rely solely on the seismic data set obtained for the monitor survey for fully reconstructing the target area image without any constraints (e.g., no externally imposed constraints, but may include implicit limitations on the image imposed by the spatial sampling and areal coverage of the survey). However, particularly for a producing field, prior information about the field (e.g., the hydrocarbon bearing subsurface reservoir) typically exists (e.g., from a base survey). According to certain embodiments of the present invention, specific shape information known for zones of the target area (e.g., for zones of the hydrocarbon bearing subsurface reservoir) are used to enable a sparsely sampled monitor data set to be used for generating a 3D representation of the target area. For instance, in many instances the shape of the subsurface structures (e.g., rocks) are known (e.g., from a base survey) at the time of conducting a monitor survey. Their shape generally does not change over time. However, the amplitude of seismic reflections on those structures change with time in a producing field because the amplitude is a factor that changes when the fluids present change. Thus, in certain embodiments, the shape of the reflectors are known, and the sparsely sampled monitor data set is used to determine how the amplitude has changed over time (which is the unknown information at the time of the monitor survey). By obtaining an accurate determination of the change in amplitude at a target zone of the reservoir, one can determine how the fluid present in the reservoir has changed. For instance, if water is now present in the reservoir instead of oil, the amplitude is different from what it was when oil was present, whereas if oil is still present at the target zone of the reservoir then the amplitude remains substantially the same.

Thus, by knowing the shape of the reflector, only seismic traces obtained from places where they contribute to the reflector image may be added to accurately determine the amplitude of the response. Sweeping is not required, and thus artifacts that degrade the image are eliminated.

Accordingly, in certain embodiments, a technique for generating a 3D image for a sparsely sampled monitor data set (e.g., of seismic data) is provided, which processes the amplitude changes on the known subsurface structure (i.e., having the known shape). Such sparsely sampled monitor data set is, when considered alone, insufficient for accurately generating a 3D representation of the target area. However, according to embodiments of the present invention, using the known shape of the subsurface structure, the sparsely sampled monitor data set may be processed in a way that generates an accurate 3D image of the reflector (that does not have unacceptable artifacts). Thus, certain embodiments of the present invention, enable determination of the changes in amplitude received in the sparsely sampled monitor data set that are related to movements of fluids in the producing reservoir.

According to one embodiment, an accurate representation of the target area may be initially determined (e.g., prior to determining to drill the target area) by conducting a fully sampled 3D seismic survey (i.e., a "base survey"). That is, at a first time, a fully-sampled base data set is acquired for a base survey of the target area. An accurate shape of the seismic reflectors present in the target area may be determined from the fully sampled base data set.

Then, at a second time that is different from the first time (e.g., typically one to three years later), a sparsely sampled monitor data set is acquired for the target area. In certain embodiments, such sparsely sampled monitor data set that is acquired for the later time-lapsed seismic monitor survey is so limited that it alone is insufficient to generate an accurate 3D representation of the target area. Thus, in the time-lapsed survey, a sparsely sampled monitor data set is acquired (e.g., only in certain locations in the field), and sufficient data processing need not be performed to determine the shape of the reflectors because that is already known (from the base survey). Instead, the predetermined shape of the reflectors is used to more accurately compute, from the sparsely sampled monitor data set that is acquired, the amplitude data from the reflectors of the target area at the later time.

FIG. 1 shows a general flow diagram according to certain embodiments of the present invention. In operational block 11, a sparsely sampled seismic monitor data set is obtained within a target area being analyzed. This sparsely sampled seismic monitor data set may be acquired by conducting a survey or may be data provided from survey that has been conducted or calculated. In block 12, the sparsely sampled seismic monitor data set is processed to generate a 3D representation of the target area (e.g., the reservoir or subsurface region), and in block 13 the generated 3D representation is analyzed to interpret changes in the target area that have occurred since the previous survey (e.g., the base survey or a previous monitor survey). Then, the interpreted changes may be used to produce hydrocarbons from the target area, as shown in block 15. This may involve determining how to change well operations (e.g., drilling producer or injection wells, secondary recovery techniques, or other known techniques) based on the interpreted changes.

It should be recognized that the operational flow of blocks 11-13 and 15 generally correspond to conventional techniques for performing a time-lapsed monitor survey, except conventionally a fully sampled monitor data set is acquired instead of only a sparsely sampled monitor data set being acquired in block 11. The sparsely sampled monitor data set may be obtained, for example, by employing (in the seismic data acquisition of the survey) less density of source and receiver locations than that commonly employed for an initial base survey. In certain embodiments, the sparsely sampled monitor data set that is obtained in block 11 is so limited that it alone is insufficient to generate an accurate 3D representation of the target area.

However, accuracy of the 3D representation of the target area is achieved through use, in block 14, of certain external information in addition to the obtained sparsely sampled monitor data set for generation of the 3D representation. According to certain embodiments, such external information is utilized in designing the acquisition of the sparsely sampled monitor data set (of block 11) and/or in processing of the sparsely sampled monitor data set (in block 12), thereby enabling a sparsely sampled monitor data set to be acquired for the monitor survey while also enabling generation of an accurate 3D representation of the target area. As discussed further herein, external information, which may come from seismic or non-seismic sources, is used in certain embodiments to design a limited-effort acquisition program (for acquisition of the sparsely sampled monitor data set in block 11). Additionally or alternatively, in certain embodiments the external information is incorporated into the processing of the obtained sparsely sampled monitor data set (in block 12).

In one embodiment, the external information of block 14 may be information regarding the shape (or "geometry") of seismic reflectors present in the target area. That is, the external information of block 14 may include a structure map of target seismic reflectors present in the target area (e.g., hydrocarbon bearing subsurface reservoir or subsurface region). In certain embodiments, the shape information for the reflectors is predetermined shape information, which may be predetermined from a fully sampled base survey conducted for the target area. For instance, as discussed further herein, in certain embodiments a fully sampled base survey that is suitable for conventional 3D imaging may be conducted at a first time for the target area. From the base survey, a structure map of target reflectors present in the target area is determined. A sparsely sampled monitor data set is then recorded at a later time, wherein the sparsely sampled monitor data set is insufficient alone for use in conventional 3D imaging for accurately generating a 3D representation of the target area. However, according to certain embodiments, the predetermined structure map of the target area is used to aid in determining suitable seismic monitor data acquisition (e.g., from appropriate target locations in the target area) and to aid in processing of the acquired sparsely sampled monitor data set for accurately generating a 3D representation of the target area as the target area exists at the time the sparsely sampled monitor data set is acquired.

In certain embodiments, the reflector shape information may not be known from a prior base survey. Instead, in certain embodiments, the shape information may include a structure image that is constructed from the sparsely sampled monitor survey being conducted, as discussed further herein.

More particularly, as a specific example of FIG. 1, the external information 14 includes a structure map of target reflectors present in the target area. In this exemplary embodiment, the external information 14 includes predetermined information, such as information predetermined from a fully sampled base survey of the target area, as discussed hereafter. For instance, the structure map may be of one or more specific target reflectors within a hydrocarbon bearing subsurface reservoir that is being analyzed. The reflectors that are the "targets" may be determined from previous seismic data and from wells drilled into the reservoir. Because this is a time-lapse application, one or more wells may have been drilled to produce the hydrocarbons that the reservoir contains. Data from these wells may provide the information about which seismic reflectors correspond to hydrocarbon-producing layers, which may be used to generate a structure map. A "structure map" is basically a topographic map of a reflecting surface, which provides the depth (negative elevation) of the reflector as a function of horizontal position.

A sparsely sampled monitor data set is obtained in block 11, wherein the sparsely sampled monitor data set covers the target reflectors identified in block 14. That is, the sparsely sampled monitor data set obtained in block 11 includes seismic monitor data acquired at the locations of the target reflectors identified in block 14, in this exemplary embodiment. This sparsely sampled monitor data set may be acquired by conducting a survey or may be data provided from survey that has been conducted or calculated. In this embodiment, the sparsely sampled monitor data set obtained in block 11 is insufficient for use in conventional 3D imaging to generate a 3D representation of the target area.

In operational block 12, the sparsely sampled monitor data set obtained in block 11 is processed to determine an accurate 3D representation of the target area. For instance, in this exemplary embodiment, the recorded sparsely sampled monitor data traces of the sparsely sampled monitor data set (of block 11) are imaged on the reflector surfaces present in target area. In this embodiment, the structure map of the target reflectors (of block 14) is used to image seismic amplitudes on the reflecting surface in block 12 to generate an accurate 3D representation of the target area.

In operational block 13, the target area (e.g., hydrocarbon bearing subsurface reservoir) changes are interpreted/analyzed to; for example, determine an appropriate management strategy to employ for extracting hydrocarbon reserves from the target area. That is, the 3D representation generated in block 12 is analyzed in block 13 to; for instance, determine an appropriate production management strategy to employ for the hydrocarbon bearing subsurface reservoir present at the target area.

Thus, in this exemplary embodiment, knowledge of the geometry of the reflecting surface (represent in block 14) is used to design a limited (or "sparse") acquisition program that covers the target (which is employed in block 11 for conducting the sparsely sampled monitor data acquisition), and to image (in block 12) seismic amplitudes on the reflecting surface without generating the imaging artifacts that occur with conventional 3D migration.

Thus, in this exemplary embodiment, the external information 14 of FIG. 1 includes structure maps of specific target reflectors within the target area being analyzed (e.g., the target hydrocarbon bearing subsurface reservoir). Knowing the geometry of the target reflectors in this example makes it possible to design a limited seismic acquisition program that covers the reflectors, which is employed in the acquisition of block 11.

Previous work has shown that applying conventional imaging to this kind of sparsely sampled monitor data set results in amplitudes that are contaminated with non-repeatable artifacts. Because much of the information about reservoir changes comes from changes in the seismic amplitude response, conventional images are thus unsuitable for time-lapse applications.

However, embodiments of the present invention recognize that if the geometry of the reflector is known, this geometry information (e.g., of block 14) can be used in the processing step (block 12 of FIG. 1) to produce amplitude maps of the target reflectors that are free of artificial variations, as discussed further herein.

Figure 2:
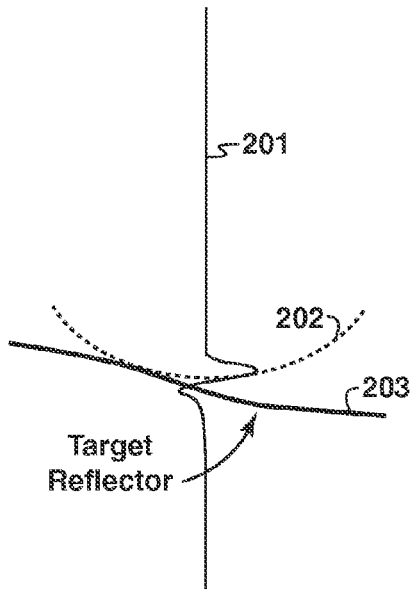
FIG. 2 shows a conventional Kirchhoff migration, which has no information about the reflector geometry.

FIG. 2 shows a conventional Kirchhoff migration. This conventional migration has no information about the reflector geometry, and so it sweeps each sample of an input trace 201 over a surface 202 that includes all the possible reflection points that could have produced a reflection with the arrival time of that trace 201. This surface 202 is indicated by the dashed line, while the reflector or reflecting surface 203 is indicated by the solid line. After applying a similar sweeping process to many additional traces recorded in the vicinity of trace 201, the swept samples from the collection of traces will add constructively along the surface 202 that corresponds to the actual reflector 203, and will not add constructively elsewhere. This technique works well when the seismic sampling includes a large number of evenly-spaced traces. When the number of such sampling traces is large and regularly distributed, as with normal fully sampled seismic data acquisition, the swept samples sum to nearly zero away from the reflector. However, when the number of input traces is small or irregularly spaced, as with a sparsely sampled monitor data set acquisition, the sweeps do not cancel. Typically the result is artifacts that contaminate overlying reflectors. Also, irregular input may result in non-uniform illumination of the target reflector, causing spatial variations in amplitude that are not related to changes in reflectivity.

Figure 3:
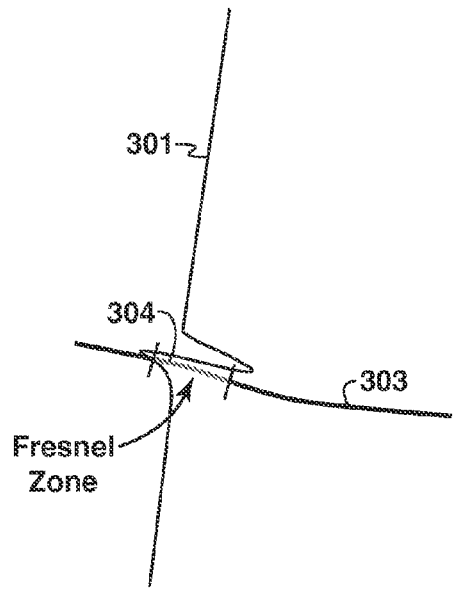
FIG. 3 shows an exemplary migration technique according to one embodiment of the present invention, wherein the sparse samples that contribute to the reflector surface (of a reflector having a known shape) are summed in a Fresnel zone around the reflection point.

Certain embodiments of the present invention take advantage of the recognition that if the geometry of the reflecting surface 203 is known, it is not necessary to sweep each sample trace over the migrated data volume. As illustrated in FIG. 3, the sample traces (represented by trace 301) (after appropriate amplitude and phase corrections) that contribute to the reflector surface 303 in a Fresnel zone 304 around the reflection point may be added. This eliminates sweep artifacts. One can also correct for non-uniform illumination of the reflector, eliminating amplitude artifacts.

In addition to knowing the geometry of the target reflector, this method utilizes knowledge of the wavelet, for determining the Fresnel zone 304, discussed below. In a producing hydrocarbon field, a predetermined fully sampled processed survey (i.e., a base survey), with well data used to verify certain aspects, is normally available to provide the prior information for this method.

In certain embodiments, the reflector geometry may be defined without using a prior fully sampled base survey. For instance, the reflector geometry may be defined in certain embodiments by performing structural imaging using the sparsely sampled monitor data set acquired for a monitor survey. Structural imaging involves applying time-and-space-varying scaling to the data, commonly using an automatic gain control (AGC) process. This reduces artifacts associated with an irregular distribution of sources and receivers, thus providing a more defined image of the geometry of the reflectors. But, it also eliminates most of the amplitude information contained in the seismic data set. Because information about time-lapse reservoir changes is contained partially in the seismic amplitudes, this approach is not beneficial for most time-lapse applications.

While FIG. 2 relates to a corresponding imaging algorithm, which is known by those of ordinary skill in the art of seismic imaging, FIG. 3 and the accompanying description relate to an enhanced imaging technique, which may include various imaging algorithms. As an example, the following is one such imaging algorithm in the space domain that may be employed in an embodiment:

a. For each recorded seismic trace s(t) (with source location $(x_S, y_S)$ and receiver location $(x_R, y_R)$),
  i. Use ray tracing through a velocity model $V(x,y,z)$ to compute the location and true amplitude weight $a_P$ of the reflection point on the known reflecting surface $z_R(x,y)$.
  ii. Use the known seismic wavelet $w(t)$ to define the Fresnel Zone around the reflection point.
  iii. For each point $(x_F, y_F, z_F)$ within the Fresnel Zone:
    1. Compute the travel time $t_i$ from $(x_S, y_S)$ to $(x_R, y_R)$, passing through $(x_F, y_F, z_F)$.
    2. Add $a_P*s'(t_i)$ to the reflector image at $(x_F, y_F, z_F)$: $A(x_F, y_F, z_F) += a_P*s'(t_i)$, where s' is the time derivative of the recorded trace.
  iv. Continue until all points in the Fresnel Zone have been accumulated.
b. Continue until all recorded traces have been processed.

where $x_S$ is the x-coordinate of the source, $y_S$ is the y-coordinate of the source, $x_R$ is the x-coordinate of the receiver, $y_R$ is the y-coordinate of the receiver, $x_F$ is the x-coordinate of the point in the Fresnel Zone, $y_F$ is the y-coordinate of the point in the Fresnel Zone, $z_F$ is the z-coordinate of the point in the Fresnel Zone, $A(x_F, y_F, z_F)$ is the reflector image.

Migrating by adding the contribution of each trace in a Fresnel zone around the reflection point is presented in the context of modeling in U.S. Pat. No. 6,691,075 (hereafter "the '075 patent"). The '075 patent generally describes a method for modeling seismic amplitudes. Embodiments of the present invention recognize that the teachings in the '075 patent may also be used for imaging, if it is combined with a knowledge of the geometry of the reflectors being imaged. Other standard imaging approaches known in the art assume that the reflectors are completely unknown except for basic limits required by the sampling used in the seismic survey. That is, the other imaging approaches do not use information regarding the geometry of the reflectors being imaged.

Also, Lüth, S., S. Buske, R. Giese, and A. Goertz, 2005, *"Fresnel Volume Migration of Multicomponent Data,"* Geophysics, 70, S121, proposes use of Fresnel zone summing for migrating recorded data. However, Lüth et al. proposes a technique that determines the location of the reflection point from the travel time and direction of the reflected arrival, as recorded on a three-component geophone. The exemplary method described above with reference to FIGS. 1 and 3 differs from the method of Lüth et al. because the present techniques, at least, use a known reflector geometry (e.g., the structure map of block 14 of FIG. 1) to locate the reflection points, instead of using estimated ray directions. Estimating ray direction in the manner proposed by Lüth et al. requires three-component recording not usually used in seismic acquisition, and the resulting estimates are typically highly uncertain for reflected arrivals because of interference from noise and from other reflections.

Figure 4:
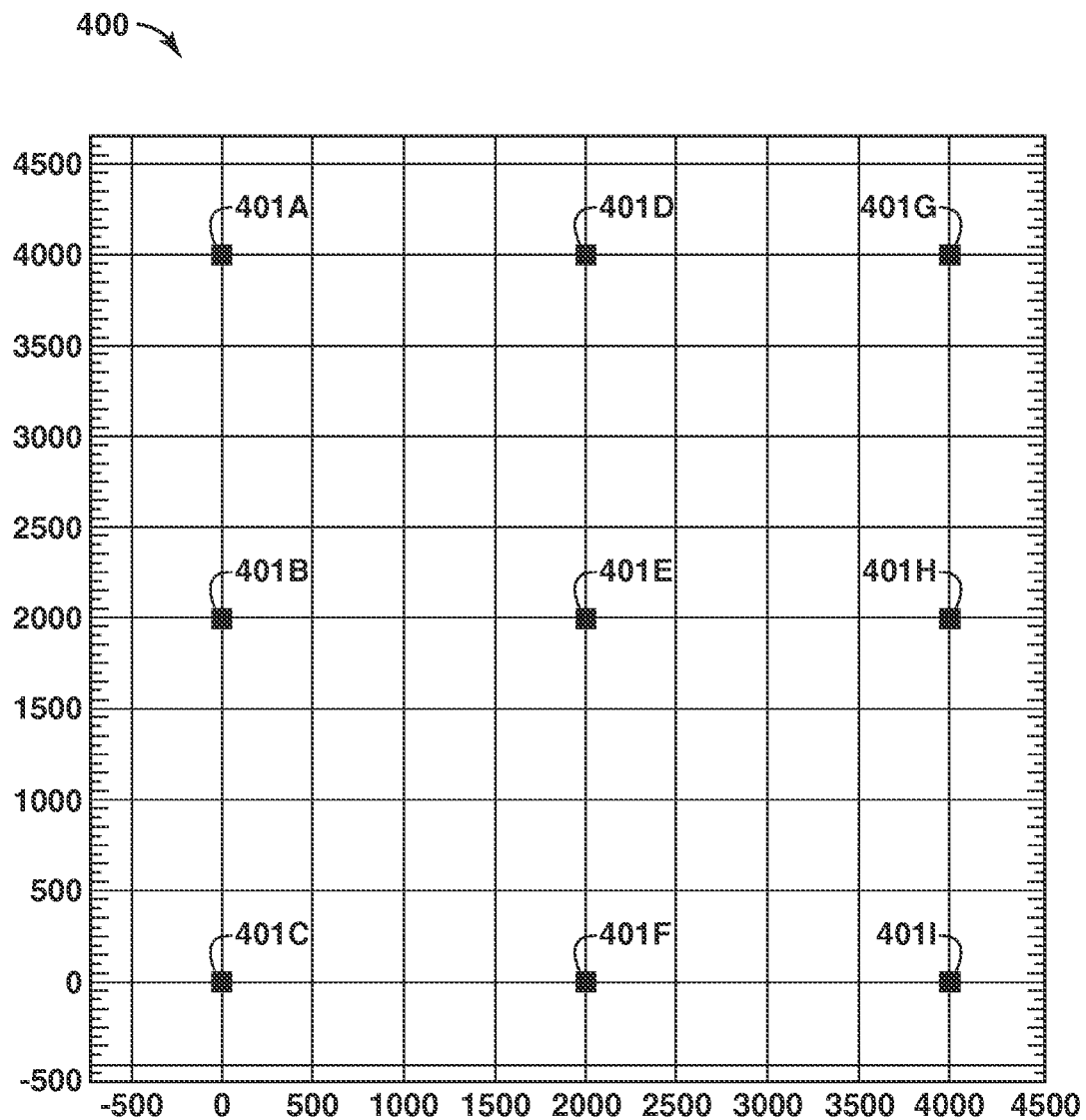
FIG. 4 shows an example of source and receiver locations that may be used for acquiring a sparsely sampled seismic monitor data set for a reflector-specific migration in accordance with an embodiment of the present invention.

As an illustration of reflector-specific migration according to one embodiment of the present invention, attention is directed now to FIG. 4. FIG. 4 shows an example of source and receiver location configuration 400 that may be used for acquiring a sparsely sampled seismic monitor data set for a reflector-specific migration in accordance with one embodiment of the present invention. The shaded squares represent receiver locations 401A-401I, and the horizontal lines represent source lines. Sources (not individually shown) are spaced apart 50 meters (m) along the horizontal lines. Coordinates along the x axis and y axis are shown in meters in this example.

With reference to the source and receiver locations 401A-401I, an exemplary target reflector may have a depth of 2400 m at the center of the survey area, dipping 2.6° at an azimuth of 120°. For this exemplary target reflector, the layout or configuration of sources and receivers described above covers the reflector with at least one reflection point inside every 25×25 m bin. The source-receiver layout is typical of a low-effort survey using single-receiver nodes (the shaded squares 401A-401I) placed on the sea floor. To acquire this data, a seismic source boat has to sail many lines (i.e. representative of the horizontal lines in the reflector-specific migration) to cover the survey area. This still takes about a factor of ten less time than a conventional streamer survey covering the same area in a fully sampled survey. So, despite the fact that this sampling provides full coverage of the target reflector, the configuration in FIG. 4 qualifies as a sparsely sampled seismic survey. That is, this type of survey may be used to get structural information with minimal field effort, but the quality of the amplitude information (from conventional imaging) is not useful for time-lapse application.

Figure 5:
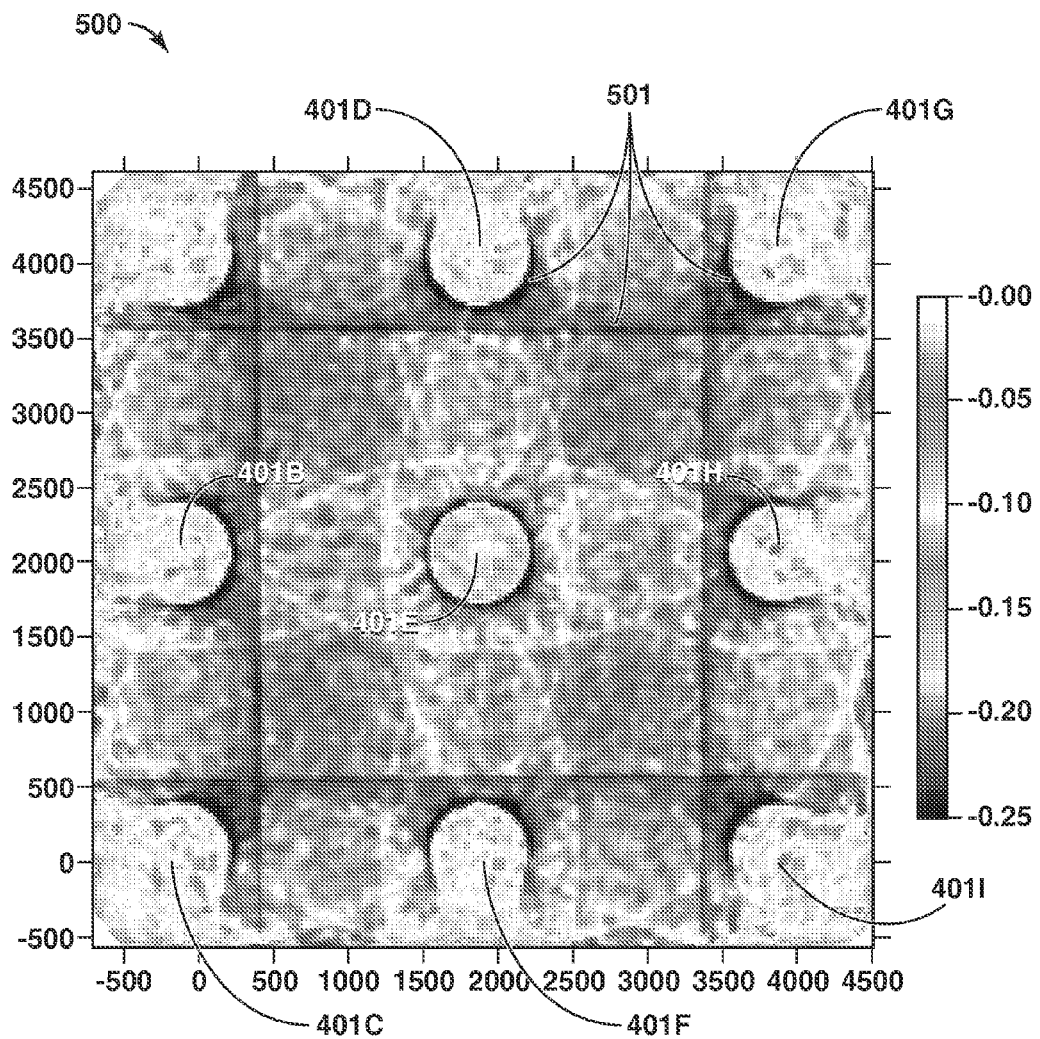
FIG. 5 shows an exemplary map of migrated amplitudes at the target reflector that results from applying conventional imaging to data modeled using the acquisition geometry of FIG. 4.

As an example, FIG. 5 shows an exemplary map 500 of migrated amplitudes at the target reflector that results from applying conventional imaging to data modeled using the acquisition geometry or configuration of FIG. 4. Similar to the discussion above, the shaded squares represents receiver locations 401A-401I, and the sources are spaced apart 50 meters (m) along the horizontal lines shown in FIG. 4. The coordinates along the x axis and y axis of FIG. 5 are shown in meters. Some of the amplitude variation in FIG. 5 is caused by amplitude versus offset (AVO) effects included in the reflector. Most of the amplitude variation, however, is due to imaging artifacts 501 associated with the limited or sparsely sampled monitor data set. The amplitude variations in the model are about 50% of the average amplitude of the target reflector, thus large enough to mask small time-lapse amplitude changes. That is, the certain time-lapse changes are large enough to be seen even with this level of artifacts, while others not detectable.

Figure 6:
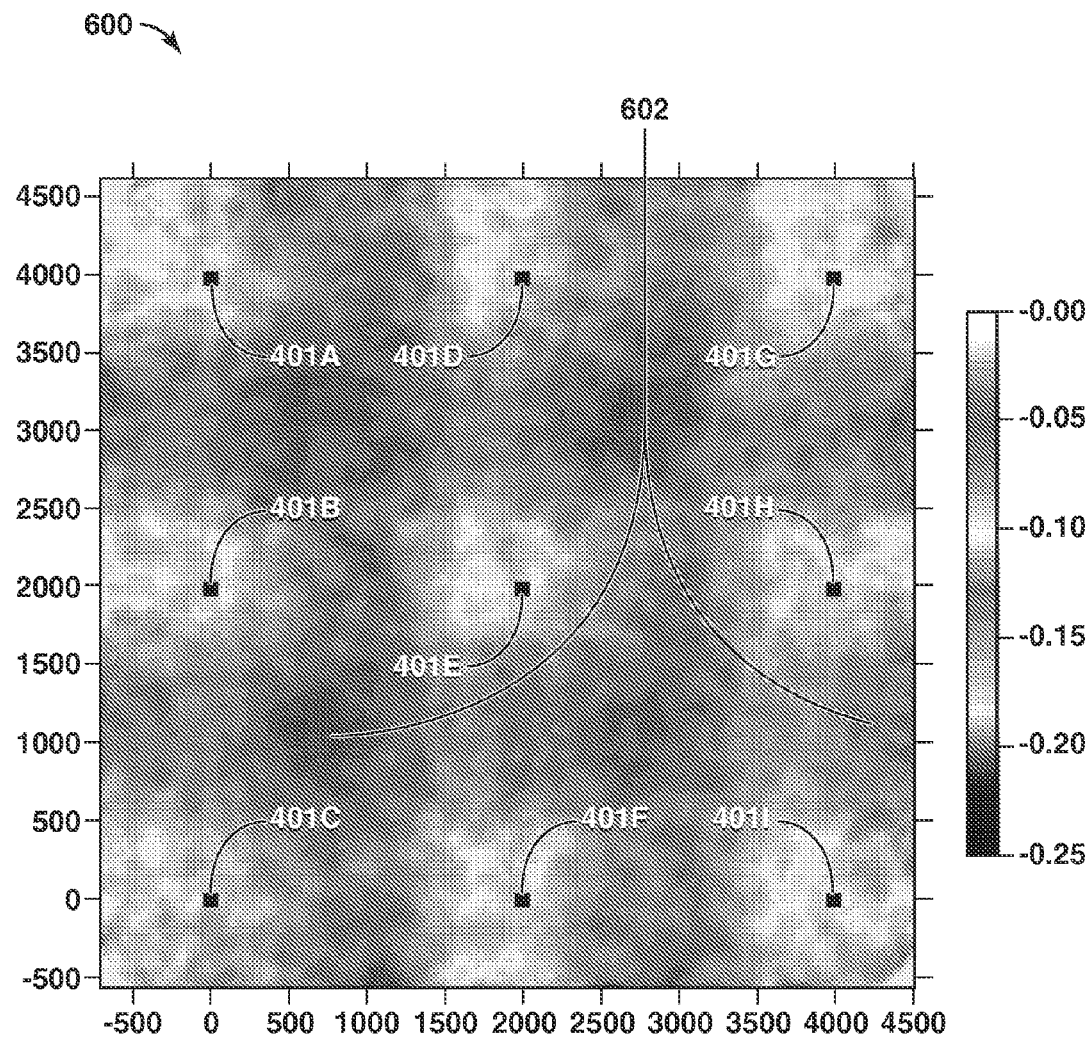
FIG. 6 shows an exemplary amplitude map that results from reflector-specific migration in accordance with an embodiment of the present invention.

However, knowing the geometry of the reflector provides external information that can be used to eliminate the artifacts by only migrating along the reflector surface, and by correcting for the known distribution of reflection points on the surface. As an example, FIG. 6 shows an exemplary amplitude map 600 that results from reflector-specific migration in accordance with one embodiment of the present invention. Again, the shaded squares represents receiver locations 401A-401I, and the sources (not shown) are spaced apart 50 meters (m) along horizontal lines; coordinates along the x axis and y axis are shown in meters. The small-scale texture regions 601 in the map is due to residual noise, but the larger-scale texture region 602 (which forms a pound-sign ("#") pattern shown in this example) is an AVO effect that is a real property of the reflector. As a result, the artifacts and noise are reduced to provide a corrected image.

Embodiments, or portions thereof, may be embodied in program or code segments operable upon a processor-based system (e.g., computer system) for performing functions and operations as described herein. The program or code segments making up the various embodiments may be stored in a computer-readable medium, which may include any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Figure 7:
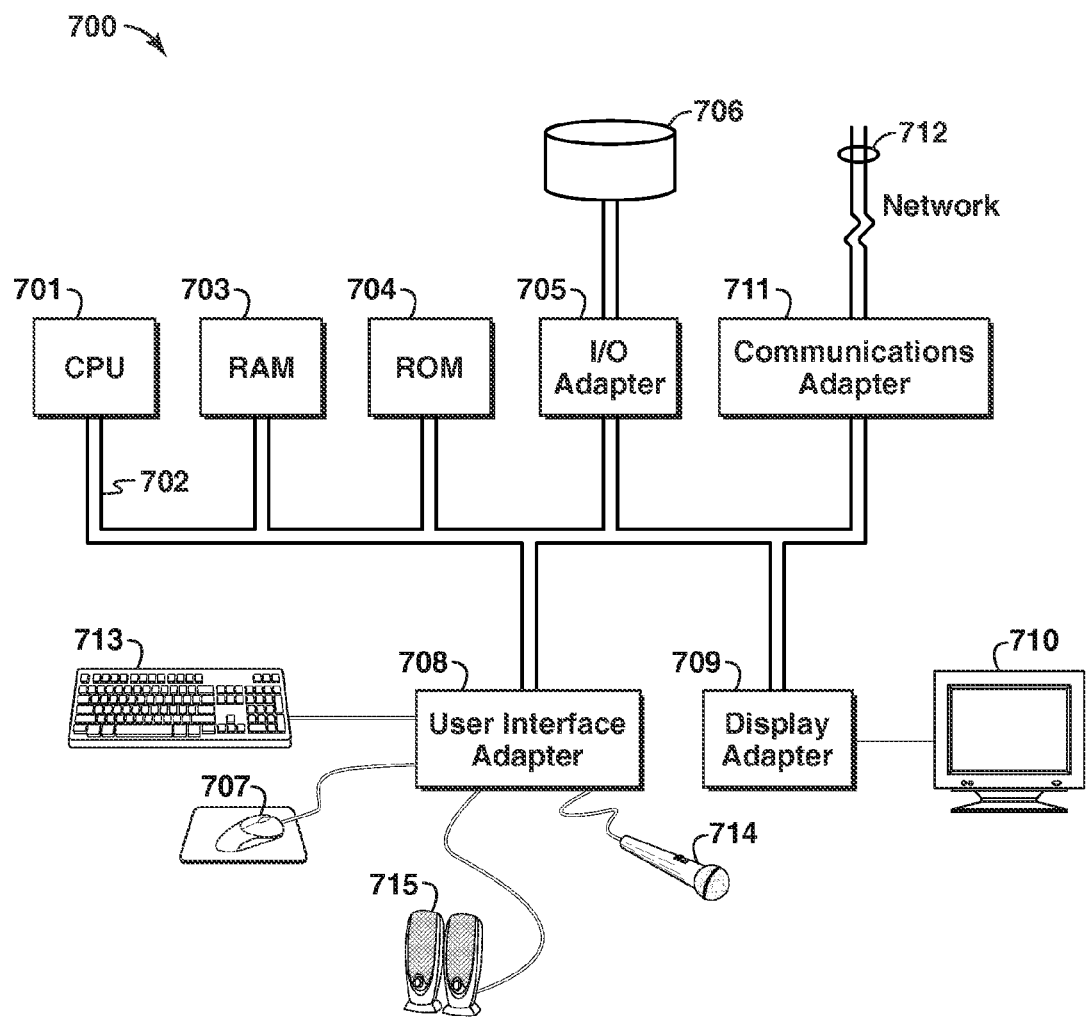
FIG. 7 shows an exemplary computer system which may implement all or portions of certain embodiments of the present invention.

FIG. 7 illustrates an exemplary computer system 700 on which software for performing processing operations of embodiments of the present invention may be implemented. Central processing unit (CPU) 701 is coupled to system bus 702. CPU 701 may be any general-purpose CPU. The present invention is not restricted by the architecture of CPU 701 (or other components of exemplary system 700) as long as CPU 701 (and other components of system 700) supports the inventive operations as described herein. CPU 701 may execute the various logical instructions according to embodiments. For example, CPU 701 may execute machine-level instructions for performing processing according to the exemplary operational flow described above. For instance, CPU 701 may execute machine-level instructions for performing operational block 12A of FIG. 2, as an example.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for operations of embodiments of the present invention. The data storage of computer system 700 may be used for storing such information as a structure map of target reflectors (e.g., as in block 14 of FIG. 1), an acquired sparsely sampled seismic monitor data set 11, and/or other data used or generated in accordance with embodiments of the present invention. Communications adapter 711 is preferably adapted to couple computer system 700 to network 712, which may enable information to be input to and/or output from system 700 via such network 712 (e.g., the Internet or other wide-area network, a local-area network, a public or private switched telephony network, a wireless network, any combination of the foregoing). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display information pertaining to a target area under analysis, such as displaying a generated 3D representation of the target area, according to certain embodiments, such as the exemplary image of FIG. 6.

It shall be appreciated that the present invention is not limited to the architecture of system 700. For example, any suitable processor-based device may be utilized for implementing all or a portion of embodiments of the present invention, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for performing a time-lapse survey of a target area comprising:
    determining a shape of seismic reflectors present in the target area using information external to the monitor data set;
    obtaining a sparsely sampled monitor data set for the target area; and
    processing, using a computer, the obtained sparsely sampled monitor data set with the determined shape of the seismic reflectors to generate a 3D image of the target area as the target area exists at the time of acquisition of the sparsely sampled monitor data set, wherein the 3D image includes said reflectors with shapes determined from external information.

2. The method of claim 1 wherein the determining the shape comprises:
    obtaining, at a first time that is prior to the time of acquisition of the sparsely sampled monitor data set, a fully sampled base data set for a base seismic survey of a target area, wherein the fully sampled base data set is more densely sampled than the sparsely sampled monitor data set; and
    determining, from the fully sampled base data set, the shape of the seismic reflectors present in the target area.

3. The method of claim 1 wherein the processing comprises for each recorded seismic trace in the sparsely sampled monitor data set and having known source location and receiver location, performing ray tracing through a velocity model to compute location and true amplitude weight of a reflection point on a known reflecting surface.

4. The method of claim 3 wherein the processing further comprises using a known seismic wavelet to define a Fresnel Zone around the reflection point.

5. The method of claim 4 further comprising for each point within the Fresnel Zone, computing travel time from the source location to the Fresnel Zone point to the receiver location.

6. The method of claim 5, further comprising adding $a_p$ * $s'(t_i)$ to a reflector image at point $(x_F, y_F, z_F)$ where s' is a time derivative of the recorded seismic trace and $a_p$ is the true amplitude weight.

7. The method of claim 1 wherein the target area comprises a hydrocarbon bearing subsurface reservoir.

8. A method for performing a time-lapse survey of a target area comprising:
   obtaining, at a first time, a fully sampled base data set for a base survey of a target area;
   determining, from the fully sampled base data set, a shape of seismic reflectors present in the target area;
   obtaining, at a second time that is later than the first time, a sparsely sampled monitor data set for the target area, wherein the sparsely sampled monitor data set is less densely sampled than the fully sampled base data set; and
   processing, using a computer, the obtained sparsely sampled monitor data set with the determined shape of the seismic reflectors to generate a three-dimensional (3D) image of the target area as the target area exists at the second time, wherein the 3D image includes said reflectors with shapes determined from external information.

9. The method of claim 8 or claim 1, wherein the determined shape of the seismic reflectors is used to more accurately compute, from the sparsely sampled monitor data set, amplitude data from said reflectors.

10. The method of claim 8 or claim 2, wherein the fully sampled base data set contains a factor of at least twenty more seismic traces than the sparsely sampled monitor data set.

11. The method of claim 1 or claim 8 wherein said determining the shape of a seismic reflector comprises a topographic map of the reflector's reflecting surface, which provides depth of the reflector as a function of horizontal position.

12. The method of claim 8 wherein the processing comprises for each recorded seismic trace included in the sparsely sampled monitor data set, each recorded seismic trace having a source location and a receiver location, performing ray tracing through a velocity model to compute location and true amplitude weight of a reflection point on a reflecting surface known from the determining.

13. The method of claim 12 wherein the processing further comprises:
   using a known seismic wavelet to define a Fresnel Zone around the reflection point;
   for each point within the Fresnel Zone, computing travel time from source location to the Fresnel Zone point to the receiver location; and
   adding $a_p$ * $s'(t_i)$ to a reflector image at point $(x_p, y_F, z_F)$ where s' is a time derivative of the recorded seismic trace and $a_p$ is the true amplitude weight.

14. A method for imaging amplitude variations on a reflecting surface, the method comprising:
   obtaining a sparsely sampled monitor data set for a target area;
   defining a geometry of a target reflector present in the target area using information external to the monitor data set;
   estimating a seismic wavelet at the target reflector; and
   for each recorded seismic trace in the sparsely sampled monitor data set:
   a) determining, using a computer, a reflection point location and arrival time on the target reflector; and
   b) summing, using a computer, values from the recorded trace into a Fresnel zone around the determined reflection point.

15. The method of claim 14 wherein the geometry of the target reflector is defined using a different seismic data set than the sparsely sampled monitor data set.

* * * * *